(12) United States Patent
Wuest et al.

(10) Patent No.: US 10,981,549 B2
(45) Date of Patent: Apr. 20, 2021

(54) BRAKE ACTUATING DEVICE FOR A VEHICLE BRAKE SYSTEM

(71) Applicant: ZF Active Safety GmbH, Koblenz (DE)

(72) Inventors: Yvonne Wuest, Koblenz (DE); Dennis Wagner, Andernach (DE); Klaus Lemke, Hanroth (DE); Daniel Noll, Andernach (DE)

(73) Assignee: ZF Active Safety GmbH, Koblenz (DE)

( * ) Notice: Subject to any disclaimer, the term of this patent is extended or adjusted under 35 U.S.C. 154(b) by 0 days.

(21) Appl. No.: 16/614,358

(22) PCT Filed: May 14, 2018

(86) PCT No.: PCT/EP2018/062285
§ 371 (c)(1),
(2) Date: Nov. 16, 2019

(87) PCT Pub. No.: WO2018/210703
PCT Pub. Date: Nov. 22, 2018

(65) Prior Publication Data
US 2020/0189540 A1    Jun. 18, 2020

(30) Foreign Application Priority Data

May 18, 2017  (DE) .......................... 102017004775.8

(51) Int. Cl.
*B60T 11/22*   (2006.01)
*B60T 17/06*   (2006.01)
(52) U.S. Cl.
CPC ............... *B60T 11/22* (2013.01); *B60T 17/06* (2013.01)

(58) Field of Classification Search
CPC .......... B60T 11/22; B60T 17/06; B60T 11/16; B60T 11/26
See application file for complete search history.

(56) References Cited

U.S. PATENT DOCUMENTS 3,914,943 A     10/1975 Lewis
5,636,517 A *   6/1997 Mallmann ............. B60T 11/232
                                             60/562

(Continued)

FOREIGN PATENT DOCUMENTS

DE     3142981 A1 *  6/1982  ............. B60T 11/22
DE     3142981 A1    6/1982

(Continued)

*Primary Examiner* — Thomas E Lazo
(74) *Attorney, Agent, or Firm* — Robert James Harwood

(57) ABSTRACT

A brake-actuating device for a vehicle brake system comprises a fluid reservoir and a master cylinder arrangement. The fluid reservoir has an outlet connection, and the master cylinder arrangement has an inlet connection. The outlet connection of the fluid reservoir and the inlet connection of the master cylinder arrangement, in the connected-together state, define at least one axially overlapping connection region through which a fluid channel for the feed of fluid from the fluid reservoir into the master cylinder arrangement extends. Furthermore, the brake-actuating device comprises a sealing element, which is arranged in the connection region and seals off the latter to the outside, and a filter element for filtering the fluid to be fed to the master cylinder arrangement. The sealing element holds the filter element in a predetermined position in the fluid channel.

10 Claims, 5 Drawing Sheets

(56) References Cited

U.S. PATENT DOCUMENTS

| | | | |
|---|---|---|---|
| 7,073,333 B2* | 7/2006 | Tsubouchi | F15B 7/10 60/585 |
| 8,286,427 B2 | 10/2012 | Ogiwara et al. | |
| 9,550,483 B2* | 1/2017 | Lhuillier | B60T 11/232 |
| 9,896,078 B2* | 2/2018 | Noll | B60T 11/22 |
| 2005/0006190 A1 | 1/2005 | Lebret et al. | |

FOREIGN PATENT DOCUMENTS

| | | |
|---|---|---|
| DE | 3808522 A1 | 9/1989 |
| DE | 102006013626 A1 | 10/2006 |
| DE | 102013012237 A1 | 1/2015 |
| JP | H0328072 U | 3/1991 |
| JP | H0858559 A | 3/1996 |
| JP | 2011207480 A | 10/2011 |
| JP | 4876079 B2 | 2/2012 |
| KR | 20150024627 A | 3/2015 |
| KR | 20150100229 A | 9/2015 |

* cited by examiner

BRAKE ACTUATING DEVICE FOR A VEHICLE BRAKE SYSTEM

CROSS-REFERENCE TO RELATED APPLICATION

This application is a national stage of International Application No. PCT/EP2018/062285, filed May 14, 2018, the disclosure of which is incorporated herein by reference in its entirety, and which claimed priority to German Patent Application No. 102017004775.8, filed May 18, 2017, the disclosure of which is incorporated herein by reference in its entirety.

TECHNICAL FIELD

The present invention relates to an actuating device for a vehicle brake system. Such actuating devices may be used for activating an electrohydraulic vehicle brake system or else for actuating a purely hydraulic vehicle brake system. The invention furthermore relates to a vehicle brake system equipped with an actuating device of said type.

Generic actuating devices for vehicle brake systems have a master brake cylinder and a fluid reservoir. The fluid reservoir and the master brake cylinder are connected in fluid-conducting fashion via a channel.

An actuating device of said type is disclosed for example in the laid-open specification WO 2015/011045 A1 Said actuating device comprises a fluid reservoir and a master brake cylinder. The fluid reservoir has two tubular connection fittings. The connection fittings are received in receiving openings of the master brake cylinder. In each of the two tubular connection fittings, there is situated a substantially tubular insert element with a disk-shaped filter element. Furthermore, the laid-open specification WO 2015/011045 A1 also discloses a master brake cylinder with two tubular connection fittings into which in each case one tubular insert element is inserted.

SUMMARY

It is an object of the present invention to provide a brake-actuating device having a filter arrangement, which can be inserted into an existing structural space in the brake-actuating device and can be positioned exactly there without additional elements or means. Said object is achieved according to the invention by means of a brake-actuating device having the features of patent claims 1 and 8. The dependent claims relate to further advantageous embodiments.

The brake-actuating device for a vehicle brake system comprises a fluid reservoir and a master cylinder arrangement. The fluid reservoir has at least one outlet connection, and the master cylinder arrangement has at least one inlet connection. The at least one outlet connection of the fluid reservoir and the at least one inlet connection of the master cylinder arrangement, in the connected-together state, define at least one overlapping connection region through which a fluid channel for the feed of brake fluid from the fluid reservoir into the master cylinder arrangement extends. Furthermore, the brake-actuating device comprises at least one sealing element, which is arranged in the connection region and seals off the latter to the outside, and at least one filter element for filtering the fluid to be fed to the master cylinder arrangement. The at least one sealing element holds the at least one filter element in a predetermined position in the fluid channel.

The connection region corresponds substantially to the region in which the at least one outlet connection of the fluid reservoir and the at least one inlet connection of the master cylinder arrangement engage into one another in order to form the fluid channel from the fluid reservoir into the master cylinder arrangement. In other words, the at least one outlet connection of the fluid reservoir and the at least one inlet connection of the master cylinder arrangement axially overlap in the connection region. The at least one sealing element seals off the connection region between the at least one outlet connection of the fluid reservoir and the at least one inlet connection of the master cylinder arrangement in liquid-tight fashion with respect to the surroundings. The at least one sealing element thus prevents fluid in the connection region from being able to escape from the brake-actuating device and drip onto components or assemblies of a vehicle that are arranged in the surroundings of the brake-actuating device. The at least one sealing element furthermore holds the at least one filter element in a predetermined position in the fluid channel, such that the at least one filter element can filter dirt particles out of a fluid stream that flows from the fluid reservoir into the master cylinder arrangement. According to the invention, the at least one sealing element holds and positions the at least one filter element in a structural space provided in the brake-actuating device, without additional elements and means, and also without structural or constructional modifications to the fluid reservoir and/or to the master cylinder arrangement, being required for this purpose.

The at least one filter element may be arranged in the fluid channel between the at least one sealing element and a base of the inlet connection of the master cylinder arrangement. In a flow direction of a fluid stream from the fluid reservoir through the fluid channel into the master cylinder arrangement, the at least one filter element may be arranged downstream of the sealing element and upstream of the base of the inlet connection of the master cylinder arrangement. The fluid can be filtered by means of the filter element in or directly downstream of the connection region before the fluid enters the master cylinder arrangement through an opening in the base of the inlet connection. The sealing element can, by means of its face side facing toward the filter element, press the filter element against the base of the inlet connection of the master cylinder arrangement. The sealing element is preferably produced from an elastic material and can elastically preload the filter element against the base of the inlet connection. The filter element can be placed into the inlet connection of the master cylinder arrangement. The sealing element may be arranged on the outlet connection of the fluid reservoir and, together with the outlet connection of the fluid reservoir, be connected in fluid-conducting fashion to the inlet connection of the master cylinder arrangement. Alternatively, the sealing element may be attached to the inlet connection of the master cylinder arrangement prior to the fluid-conducting coupling of the connections of the fluid reservoir and of the master cylinder arrangement, and the fluid-conducting coupling of the connections may be performed subsequently. In both cases, the sealing element can, by means of its face side, elastically preload the filter element against the base of the inlet connection and thereby hold the filter element in its predetermined position in the fluid channel.

The filter element may comprise a filter which is of non-disk-shaped design. Owing to the non-disk-shaped design of the filter, a large usable filter area for filtering the fluid can be realized. The filter may for example be of shell-shaped, trough-shaped, funnel-shaped, pyramid-shaped or cone-shaped form. Furthermore, the filter may generally have a concave or convex bulge. The filter of the filter element may be in the form of an elastic filter fabric or formed as a screen. A filter in the form of a screen may for example be produced from a plastic.

The at least one filter element may be equipped with at least one carrier body, which may for example be composed of plastic. The carrier body may be formed integrally on the filter of the filter element by means of an injection molding process. The filter, which may for example be produced from an elastic fabric, can be placed into an injection mold. During the injection molding process, the still-liquid material of the carrier body can surround the edge region of the filter and, after the curing of the material; fixedly connect the filter to the carrier body. The carrier body can stretch out the elastic fabric of the filter. The carrier body of the filter element may be of ring-shaped form. For the positioning of the filter element, the carrier body can be supported on the sealing element, in particular on that face side of the sealing element which faces toward the filter element, and on the base of the at least one inlet connection of the master cylinder arrangement. The filter element may also be formed without a separate carrier body. In this case, the edge regions of the filter element may be reinforced or thickened in order to interact with the sealing element for the positioning of the filter element.

The at least one filter element may be fixedly connected to the sealing element. The edge regions of the filter element may be fixedly connected to the face side of the sealing element. A fluid flowing through the sealing element can be filtered by the filter element connected to the face side of the sealing element. The at least one filter element may also be formed integrally with the sealing element. The usable filter area may in this case be dependent on the cross section of an opening, which can receive a connection of the fluid reservoir or of the master cylinder arrangement, in the sealing element. The filter element may be fixedly connected to the sealing element during the production of the latter. The sealing element composed of an elastic material may be produced by means of an injection molding process, and the filter element can be placed into an injection mold. During the injection molding process, the still-liquid material for the sealing element can surround the edge region of the filter element and thus, after the curing of the material, produce a fixed connection between the filter element and the sealing element.

The object of the invention as stated in the introduction is furthermore achieved by means of a brake-actuating device for a vehicle brake system, which brake-actuating device comprises a fluid reservoir, which comprises at least one outlet connection, and a master cylinder arrangement, which comprises at least one inlet connection and at least one pressure chamber. The at least one pressure chamber has at least one inlet opening. The at least one outlet connection of the fluid reservoir and the at least one inlet connection of the master cylinder arrangement, in the connected-together state, define at least one overlapping connection region through which a fluid channel for the feed of fluid from the fluid reservoir into the master cylinder arrangement extends. The brake-actuating device furthermore comprises at least one filter element for filtering the fluid to be fed to the at least one pressure chamber. The at least one filter element is arranged in a portion of the fluid channel in the master cylinder arrangement, which portion is situated between the connection region and the at least one inlet opening.

The at least one filter element is inserted into the portion of the fluid channel in the master cylinder arrangement. No further elements, and also no constructional modifications to the fluid reservoir and/or to the master brake cylinder, are required for the positioning of the filter element. The at least one filter element is merely inserted into the stated portion of the fluid channel and can then filter dirt particles out of the fluid before the fluid reaches the at least one pressure chamber of the master cylinder arrangement. If the fluid reservoir has to be separated from the master cylinder arrangement, the at least one filter element can remain at its predetermined position in the portion of the fluid channel. Even after recoupling of the fluid reservoir to the master cylinder arrangement, repositioning of the at least one filter element is not necessary.

The at least one filter element may be designed such that the filter element can maintain a predetermined position in that portion of the fluid channel which extends between the connection region and the at least one inlet opening. The at least one filter element may be arranged in a portion of the fluid channel, which portion extends between a base of the at least one inlet connection and the at least one inlet opening of the at least one pressure chamber. The filter element may be in direct fluid-conducting contact with the portion of the fluid channel in the master cylinder arrangement. The at least one filter element may extend over the entire length of that portion of the fluid channel which runs between the base of the inlet connection and the inlet opening of the pressure chamber. A face surface of the filter element may terminate flush with the base of the inlet connection. The at least one filter element may be fixed by means of frictional engagement in that portion of the fluid channel which extends between the connection region and the at least one inlet opening.

The at least one filter element may be of cylindrical design or be of rod-shaped form. The shape of the at least one filter element may be selected in a manner dependent on whether the filter element is intended to completely fill the cross section of the portion of the fluid channel in order to prevent a flow of the fluid past the filter element. For the filter element, it is possible for a shape which ensures frictional engagement between the filter element and the wall of the portion of the fluid channel, and/or a material which assists frictional engagement between the filter element and the wall of the portion of the fluid channel, to be selected.

The at least one outlet connection of the fluid reservoir may project into an opening of the at least one inlet connection of the master cylinder arrangement. The at least one sealing element may be arranged radially between the outlet connection and the inlet connection. The inlet connection and the outlet connection, in the connected-together state, axially overlap and thus define the overlapping connection region. The at least one outlet connection of the fluid reservoir may be a connection fitting which is formed on the fluid reservoir. The at least one outlet connection of the fluid reservoir may furthermore be a connection piece which is connected via a feed line to the fluid reservoir.

The at least one filter element may be designed to not only retain but also store dirt particles. In this way, it is possible, for example in the event of a return of fluid from the master cylinder arrangement into the fluid reservoir, to prevent dirt particles that have been retained by the filter from being transported back into the fluid reservoir again. In this context, the storing is to be understood as a storage of dirt particles in the context of a predetermined capacity that the filter element can accommodate before noticeable throttling of the fluid stream through the filter element occurs. The predetermined capacity corresponds to a predetermined volume of dirt particles that the filter element can accommodate before noticeable throttling of the fluid stream occurs.

The present invention furthermore relates to a sealing element having a filter element fixedly connected thereto, for use in a brake-actuating device of the described type.

Furthermore, the present invention relates to a vehicle brake system having a brake-actuating device of the described type.

BRIEF DESCRIPTION OF THE FIGURES

Three exemplary embodiments of a brake-actuating device according to the invention will be described in more detail below on the basis of the appended schematic figures, in which.

DETAILED DESCRIPTION

Figure 1:
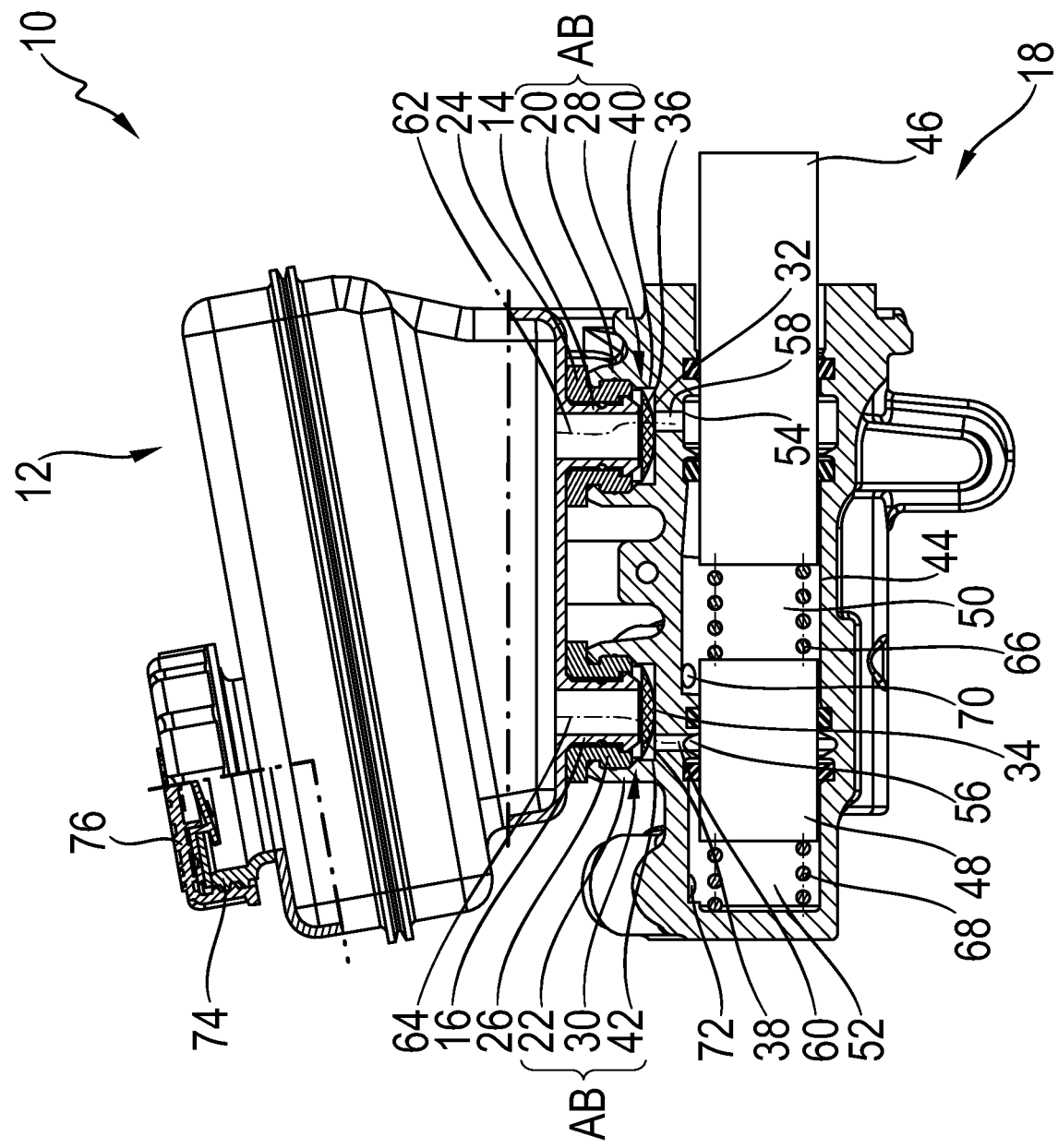
FIG. 1 shows a partially sectional view of a brake-actuating device according to a first exemplary embodiment.

FIG. 1 shows a partially sectional view of a brake-actuating device, denoted generally by 10, for a vehicle brake system. The brake-actuating device 10 comprises a fluid reservoir 12, which comprises two outlet connections 14, 16 for the discharge of a fluid, such as for example a brake fluid, which is stored in the fluid reservoir 12. The outlet connections 14, 16 are formed as tubular connection fittings, Via the tubular connection fittings 14, 16, the fluid reservoir 12 is coupled to a master cylinder arrangement 18.

The master cylinder arrangement 18 has two inlet connections 20 and 22, which are likewise formed as connection fittings. The connection fittings 14, 16 of the fluid reservoir 12 project into the openings of the connection fittings 20, 22 of the master cylinder arrangement 18, such that the connection fittings 14, 16 of the fluid reservoir 12 and the connection fittings 20, 22 of the master cylinder arrangement 18 axially overlap one another. This overlap between the connection fittings 14, 16 of the fluid reservoir 12 and the connection fittings 20, 22 of the master cylinder arrangement 18 defines in each case an overlapping connection region AB. In the connection regions AB, there are arranged sealing elements 24 and 26, which seal off the connection regions AB with respect to the surroundings. The sealing element 24 is arranged radially between the connection fitting 14 of the fluid reservoir 12 and the connection fitting 20 of the master cylinder arrangement 18, and the sealing element 26 is arranged radially between the connection fitting 16 of the fluid reservoir 12 and the connection fitting 22 of the master cylinder arrangement 18. The sealing elements 24 and 26 are formed as sealing collars which surround the connection fittings 14, 16 of the fluid reservoir 12. On the ends of the connection fittings 14, 16 of the fluid reservoir 12, there are formed radially outwardly protruding projections which engage in each case into a corresponding recess of the sealing elements 24, 26. In the same way, the connection fittings 20, 22 of the master cylinder arrangement 14 have, at their ends, a radially inwardly directed projection which engages into a complementary groove of the sealing elements 24, 26.

As illustrated, the sealing elements 24, 26 are in each case in contact with a filter element 28, 30 and press said filter element against the base 32 or 34 respectively of the associated inlet connection 20, 22. The filter elements 28, 30 comprise in each case one filter 36, 38 and one carrier body 40, 42 which is fixedly connected to the filter 36, 38. The carrier body 40, 42 is in this case of ring-shaped form and produced from plastic. It may for example be integrally formed on the filter 36, 38 by means of an injection molding process. The filters 36 and 38 may be produced from a close-mesh elastic fabric.

Via the connection regions AB, a hydraulic fluid such as for example brake fluid is fed to the master cylinder arrangement 18, In the master cylinder arrangement, there is formed a bore 44 in which two pressure pistons 46 and 48 are displaceably received. The pressure pistons 46 and 48, together with the recess 44, define two pressure chambers 50 and 52 in the master cylinder arrangement 18. The pressure piston 46 can be subjected to an actuation force demanded by a driver of a vehicle. Said actuation force may be generated for example by depression of a brake pedal that is coupled to the pressure piston 46. The actuation force may however also be generated pneumatically, electromechanically or electrohydraulically. Furthermore, the actuation force may result from a combination of the force exerted on the brake pedal by a driver and from a pneumatically, electromechanical or electrohydraulically generated additional force.

Inlet openings 54, 56 are formed in the master cylinder arrangement 18. The inlet opening 54 is assigned to the pressure chamber 50, and the inlet opening 56 is assigned to the pressure chamber 52. Through the inlet openings 54 and 56, fluid can flow out of the fluid reservoir 12 into the pressure chambers 50 and 52. The inlet openings 54 and 56 form the termination of a channel portion 58, 60 that extends between the base 32, 34 of the inlet connections 20, 22 of the master cylinder arrangement 18 and the inlet opening 54, 56. The channel portions 58 and 60 are part of a fluid channel that extends between the fluid reservoir 12 and the pressure chambers 50, 52 of the master cylinder arrangement 18. The fluid channels are, in FIG. 1, schematically illustrated by dash-dotted lines and denoted by the reference designations 62 and 64. The fluid channels 62, 64 run from the fluid reservoir 12 through the connection regions AB and the channel portions 58, 60 into the pressure chambers 50, 52. The filter elements 28, 30 are held in their predetermined position in the respective fluid channel 62, 64 by means of the sealing elements 24, 26.

Each of the pressure chambers 50, 52 is assigned a fluid channel 62 or 64, such that each pressure chamber 50, 52 can be supplied, independently of one another, with fluid from the fluid reservoir 12. In the pressure chambers 50, 52, there are provided springs 66 and 68, of which the spring 66 extends in the pressure chamber 50 between the pistons 46 and 48 and is supported against said two pistons 46, 48. The spring 68 is supported on the base of the recess 44 in the master cylinder arrangement 18 and on the piston 48. Each of the pressure chambers 50, 52 has an outlet opening 70, 72. Fluid can be discharged from the pressure chambers 50, 52 through the outlet openings 70, 72. For example, the outlet openings 70, 72 may produce a fluid-conducting connection between the pressure chambers 50, 52 and a pedal force simulation device, for example if the brake-actuating device 10 is used in a brake-by-wire vehicle brake system. The outlet openings 70, 72 of the pressure chambers 50, 52 may in each case also be connected to one or more hydraulic circuits for pressurizing connected wheel brakes with hydraulic fluid. It is likewise conceivable for each of the pressure chambers 50, 52 to be selectively couplable to a pedal force simulation device or to a hydraulic circuit for pressurizing connected wheel brakes. In the non-actuated state, a fluidic connection between the fluid reservoir 12 and the pressure chambers 50, 52 of the master cylinder arrangement 18 is possible via the fluid channels 62 and 64. In the event of an actuation of the brake-actuating device 10, the fluidic connection between the fluid reservoir 12 and the master cylinder arrangement 18 is shut off, such that a fluid stream into the pressure chambers 50, 52 via the fluid channels 62 and 64 is no longer possible. In order to be filled with a fluid, the fluid reservoir 12 has an opening 74 which can be closed by means of a closure element 76, in this case by virtue of the closure element 76 being screwed onto the fluid reservoir 12.

Figure 2:
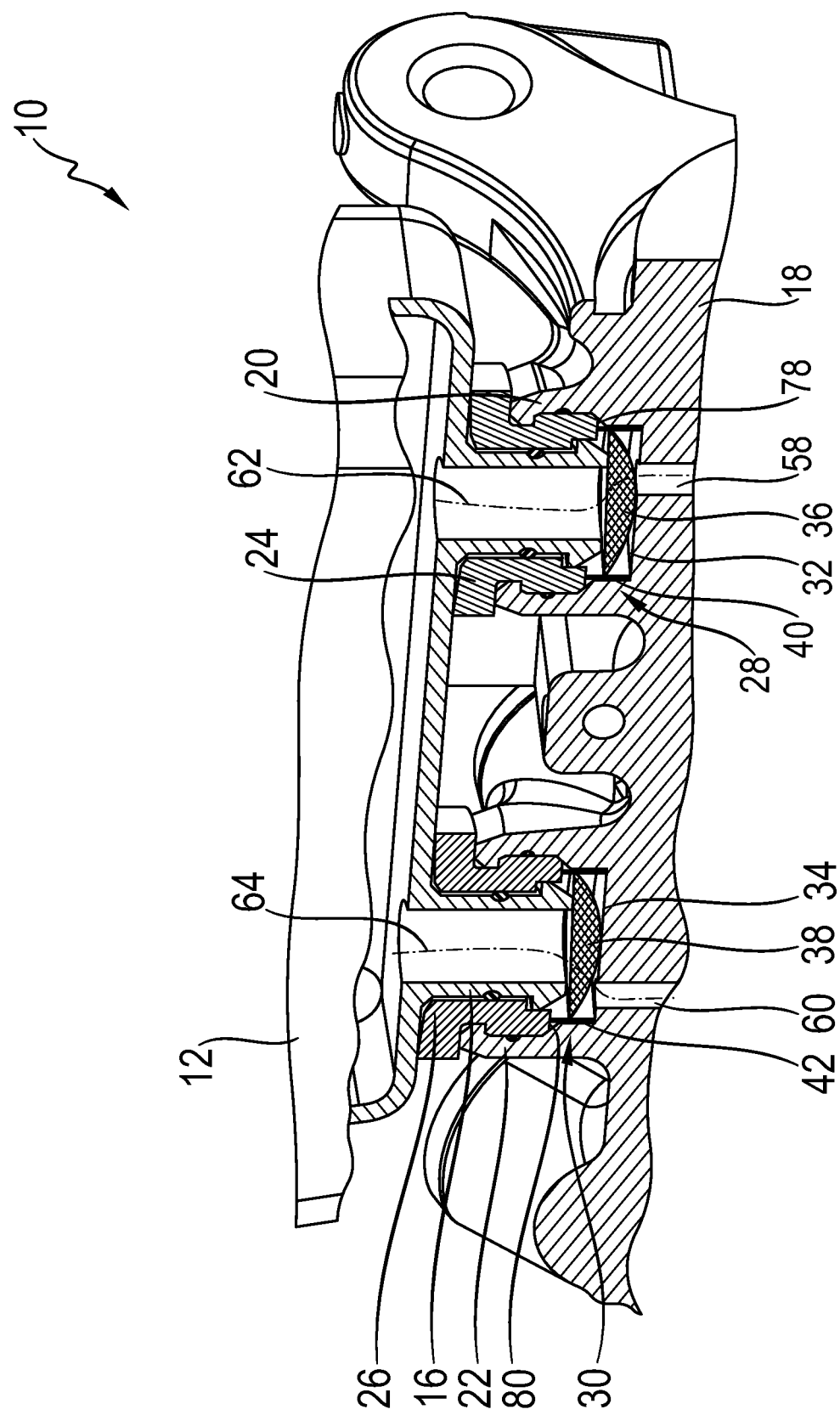
FIG. 2 shows a perspective partially sectional view of the brake-actuating device of the first exemplary embodiment.

FIG. 2 shows a perspective, partially sectional view of the brake-actuating device 10. The filter elements 28 and 30 are held in a predetermined position in the fluid channels 62, 64 by means of the sealing elements 24, 26. The filter elements 28, 30 are, in the direction of the flow of the fluid from the fluid reservoir 12 into the master cylinder arrangement 18, arranged between the sealing elements 24, 26 and the base 32, 34 of the inlet connections 20, 22 of the master cylinder arrangement 18. The ring-shaped carrier body 40, 42 of each filter element 28 and 30 is supported on a face side 78, 80 of the sealing element 24, 26 and the base 32, 34 of the corresponding inlet connection 20, 22. The filters 36 and 38 of the filter elements 28 and 30 are, in order to increase the usable filter area, of shell-shaped or trough-shaped form, such that the filters 36 and 38 are curved in the direction of the base 32, 34 of the inlet connections 20, 22. The filter elements may however also be of funnel-shaped, cone-shaped, pyramid-shaped, bushing-shaped or sleeve-shaped form, for example.

The tubular connection fittings 14, 16 of the fluid reservoir 12 have, at their end, in each case one radially outwardly protruding projection which engages into a corresponding recess of the sealing elements 24, 26. Similarly, the connection fittings 20, 22 of the master cylinder arrangement 18 are equipped, at their end, with a radially inwardly directed projection which engages into a corresponding groove of the sealing element 24, 26. The sealing elements 24, 26 are arranged radially between the connection fittings 14, 16 of the fluid reservoir 12 and the connection fittings 20, 22 of the master cylinder arrangement 18, and furthermore have a flange-shaped portion which extends in a radial direction and which extends between the face side of the connection fittings 20, 22 of the master cylinder arrangement 18 and the bottom side of the fluid reservoir 12. The sealing elements 24, 26 seal off the connection region AB between the connection fittings 14, 16 and 20, 22 in liquid-tight fashion with respect to the surroundings.

Figure 3:
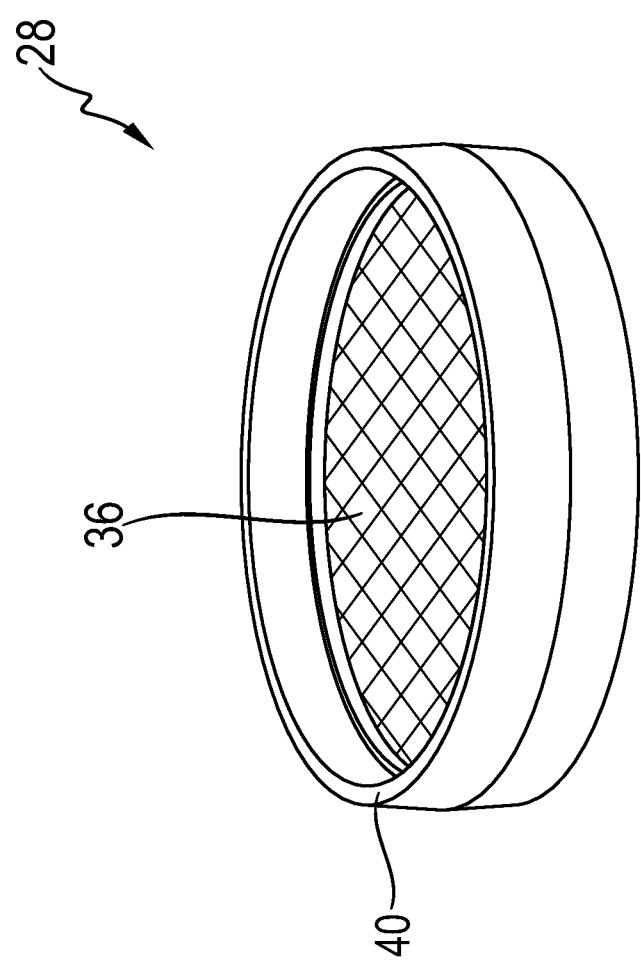
FIG. 3 shows a perspective view of a filter element of the first exemplary embodiment.

FIG. 3 shows a perspective view of a filter element 28 according to the first exemplary embodiment. The filter element 28 has a filter 36 which is composed of an elastic fabric and which is connected to a ring-shaped carrier body 40. The ring-shaped carrier body 40 is in this case produced from plastic. The ring-shaped carrier body 40 may be integrally formed on the filter by means of an injection molding process. The filter 36 may be designed not only to retain but also to store dirt particles. As a result of the storage of the dirt particles, it is possible to prevent dirt particles from being picked up and entrained by the fluid again.

Figure 4:
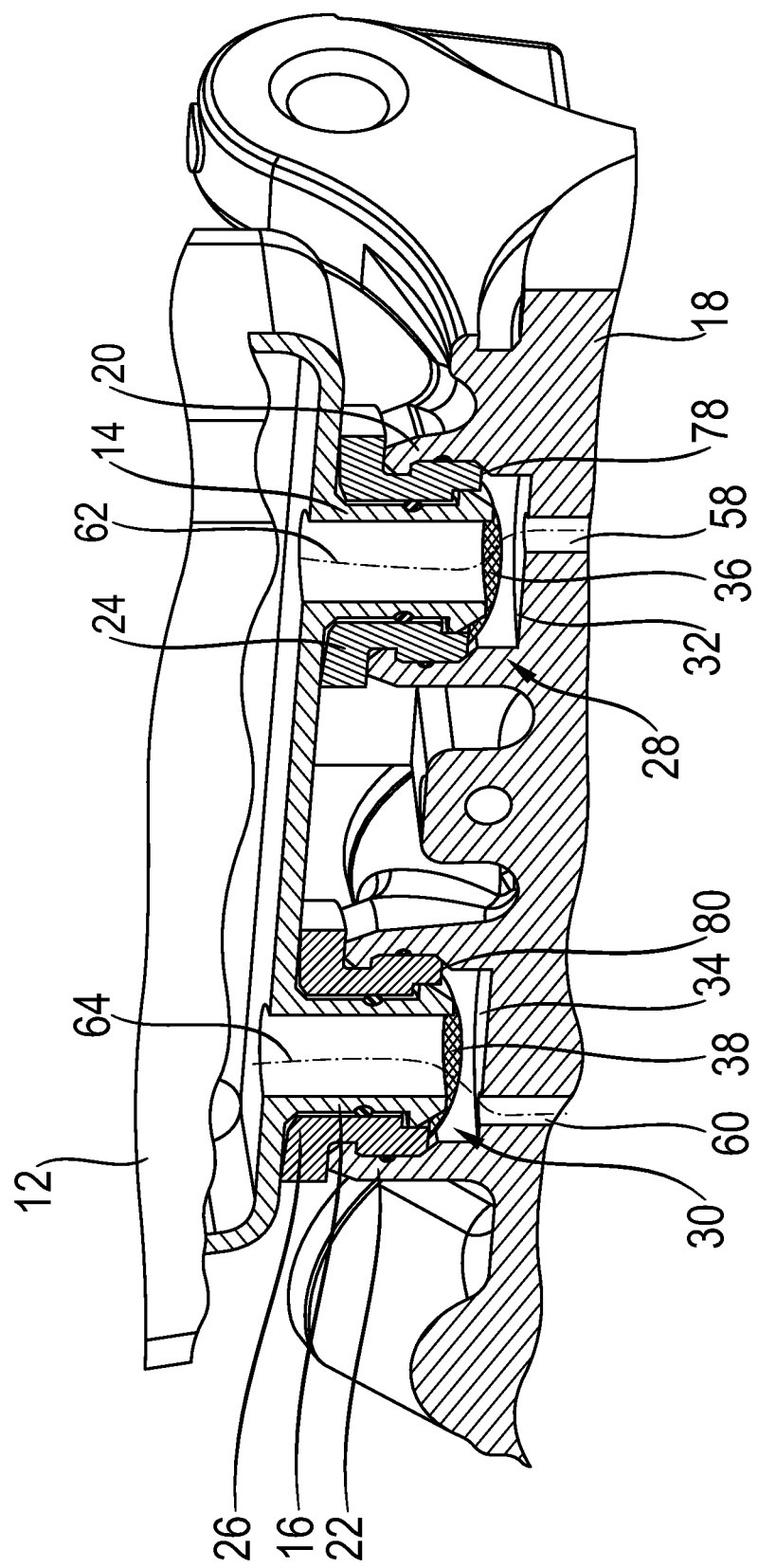
FIG. 4 shows a perspective partially sectional view of a brake-actuating device according to a second exemplary embodiment.

10035j FIG. 4 shows a perspective partially sectional view of a brake-actuating device 110 according to a second exemplary embodiment. In this exemplary embodiment, in each case one of the sealing elements 24, 26 is permanently fixedly connected to a filter element 28, 30. In other words, the sealing elements 24, 26 are formed integrally with the filter elements 28, 30. In this exemplary embodiment, too, the filter elements 28, 30 are of shell-shaped or trough-shaped form and are held, by means of the sealing elements 24, 26 fixedly connected thereto, in a predetermined position in the fluid channel 62, 64. In this exemplary embodiment, the predetermined position of the filter elements 28, 30 in the fluid channel is situated directly at the outlet opening of the tubular connection fittings 14, 16 of the fluid reservoir 12. The filter elements 28, 30 are held, by means of the sealing elements 24, 26 formed integrally therewith, in said predetermined position.

The filter element 28, 30 may be permanently fixedly connected to the sealing element 24, 26 by means of an injection molding process. For this purpose, the filter element 28, 30 can be placed into an injection mold and, during the injection molding process, fixedly connected to the elastic material of the sealing element 24, 26. The elastic material of the sealing elements 24, 26 may surround at least the edge regions of the filter element 28, 30 in order to produce a connection between the filter element 28, 30 and the sealing element 24, 26.

Figure 5:
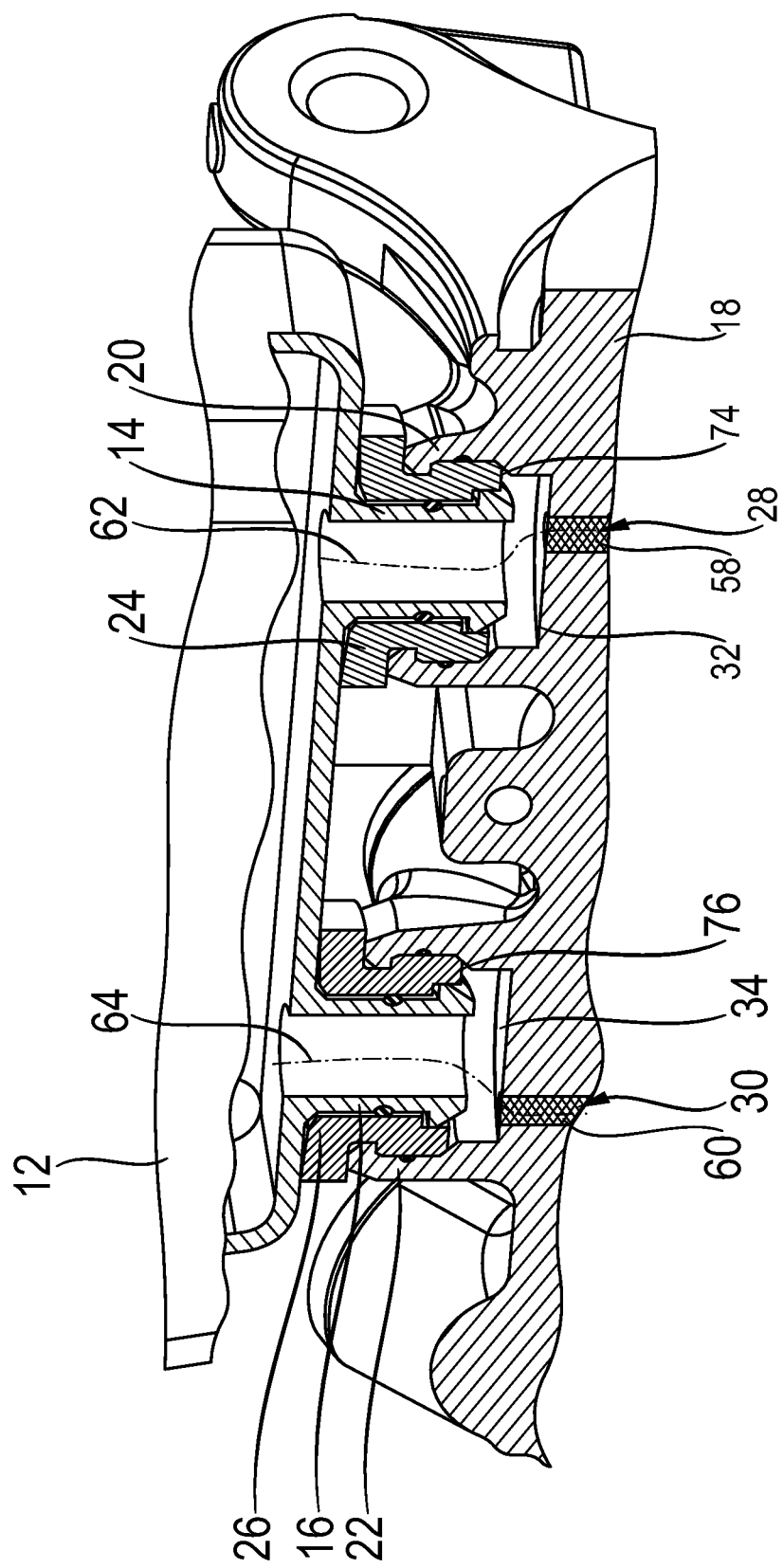
FIG. 5 shows a partially sectional view of a brake-actuating device according to a third exemplary embodiment.

FIG. 5 shows a perspective partially sectional view of a brake-actuating device 210 according to a third exemplary embodiment. In said figure, the filter elements 28, 30 are of cylindrical or rod-shaped form. The filter elements 28, 30 may be formed as a sintered filter rod. The filter elements 28, 30 are arranged in a channel portion 58, 60 which extends between the connection region AB and the inlet opening 54, 56 of the pressure chambers 50, 52 (see FIG. 1). In particular, the channel portion 58, 60 extends between the base 30, 32 of the inlet connection 20, 22 of the master cylinder arrangement 18 and the inlet openings 54, 56 of the pressure chambers 50, 52 (see FIG. 1). The filter elements 28, 30 may extend over the entire length of the channel portion 58, 60. The filter elements 28, 30 may be fixed in the channel portion 58, 60 by frictional engagement.

The described exemplary embodiments have in common the fact that the fluid reservoir 12 and the master cylinder arrangement 18, despite the arrangement of the filter elements 28, 30, do not need to be structurally modified, and also, no additional elements or means for positioning the filter elements 28, 30 need to be provided. The filter elements 28, 30 can be inserted in an existing structural space in the brake-actuating device 10, 110, 210 and exactly positioned in said structural space without additional elements or means. The fluid reservoir 12 and the master cylinder arrangement 18 are of identical form in the exemplary embodiments described above.

The invention claimed is:
1. A brake-actuating device for a vehicle brake system, having:
   a fluid reservoir which comprises at least one outlet connection,
   a master cylinder arrangement which comprises at least one inlet connection,
   wherein the at least one outlet connection of the fluid reservoir and the at least one inlet connection of the master cylinder arrangement, in the connected-together state, define at least one overlapping connection region through which a fluid channel for the feed of fluid from the fluid reservoir into the master cylinder arrangement extends, at least one sealing element, which is arranged in the connection region and seals off the latter, and at least one filter element for filtering the fluid to be fed to the master cylinder arrangement, wherein the at least one sealing element holds the at least one filter element in a predetermined position in the fluid channel.

2. The brake-actuating device as claimed in claim 1, in which the at least one filter element is arranged in the fluid channel between the at least one sealing element and a base of the at least one inlet connection of the master cylinder arrangement.

3. The brake-actuating device as claimed in claim 2, in which the at least one sealing element, by means of its face side, presses the at least one filter element against the base of the at least one inlet connection of the master cylinder arrangement.

4. The brake-actuating device as claimed in claim 1, in which the filter element comprises a filter which is of non-disk-shaped design.

5. The brake-actuating device as claimed in claim 4, in which the at least one filter element comprises at least one carrier body.

6. The brake-actuating device as claimed in claim 5, in which the at least one carrier body is of ring-shaped form and is supported on the at least one sealing element and on the base of the at least one inlet connection of the master cylinder arrangement.

7. The brake-actuating device as claimed in claim 1, in which the at least one filter element is fixedly connected to the sealing element.

8. The brake-actuating device as claimed in claim 1, in which the at least one outlet connection of the fluid reservoir projects into an opening of the at least one inlet connection of the master cylinder arrangement, and the at least one sealing element is arranged radially between the outlet connection and the inlet connection.

9. The brake-actuating device as claimed in claim 1, in which the at least one outlet connection of the fluid reservoir is a connection fitting which is formed on the fluid reservoir or is a connection piece which is connected via a feed line to the fluid reservoir.

10. The brake-actuating device as claimed in claim 1, in which the at least one filter element is designed to store dirt particles.

* * * * *